UNITED STATES PATENT OFFICE.

HANS HAGENBACH, OF BASEL, SWITZERLAND, ASSIGNOR TO J. R. GEIGY S. A., OF BASEL, SWITZERLAND.

PHTHALEIN DYE AND PROCESS OF MAKING THE SAME.

1,194,380.  Specification of Letters Patent.  Patented Aug. 15, 1916.

No Drawing.  Application filed November 17, 1915.  Serial No. 61,902.

*To all whom it may concern:*

Be it known that I, Dr. HANS HAGENBACH, citizen of Switzerland, and resident of Basel, in Switzerland, have invented certain new and useful Improvements in Phthalein Dye and Processes of Making the Same, of which the following is a specification.

My invention relates to the manufacture and production of new phthalein mordant dyes which consists in condensing 1-oxy-2-naphtoyl-o-benzoic acid or their derivatives in equimolecular proportions with pyrogallol. The condensation is carried out by means of sulfuric acid of 75–85 per cent. $H_2SO_4$ at 80–90° C. or by means of zinc chlorid at about 160° C. As derivatives of the 1-oxy-2-naphthoyl-o-benzoic acid may be employed the bodies of the general formula:

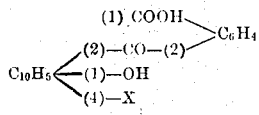

in which X represents $SO_3H$, halogen, $NH_2$. The dyestuffs therefore have a composition corresponding to the general formula:

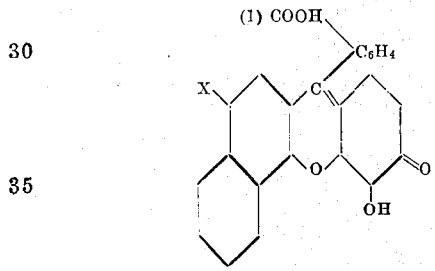

X meaning H, $SO_3H$, halogen, $NH_2$. They are in the shape of their sodium salts dark powders dissolving in water with a violet to blue shade, which by the addition of soda turn to a greenish-blue and to a green with caustic soda-lye. In concentrated sulfuric acid these powders give a dark red solution. The dyestuffs produce on wool and cotton mordanted with aluminum salts green to dark blue shades; on wool and cotton mordanted with chromium salt yellowish green to blue-green shades of excellent fastness.

The following example serves to illustrate my invention, the parts being by weight: 30 parts of 1-oxy-2-naphthoyl-o-benzoic acid and 14 parts of pyrogallol finely powdered and mixed are introduced at the ordinary temperature into 200 parts of sulfuric acid of 75–85 per cent. $H_2SO_4$. The temperature is then raised slowly to 80° C. and maintained at that point while stirring for half an hour. The clear red solution is now poured into cold water and then the dyestuff separates as a dark red crystalline precipitate which is filtered and washed. In order to produce the sodium salt, the said filtered settlement is put into 500 parts of water and soda-lye is added until a red-violet solution results. The dyestuff is now precipitated by adding common salt, filtered off, pressed and dried. In the shape of its sodium salt the dyestuff is a brilliant violet powder readily soluble in water with a red-violet color. By adding soda-lye in an excess to this solution a blue-green color is produced which turns green with caustic soda-lye. By adding acids to these solutions the free dyestuff acid is precipitated which when dried is a blue-red powder insoluble in water. It dyes wool in an acid bath slightly red-violet. Wool mordanted with aluminum salts is dyed in navy-blue, mordanted with chromium salts in blue-green shades of very good fastness to light, to fulling and to potting. Similar shades are obtained by means of corresponding mordants in cotton printing.—In this example the 200 parts of sulfuric acid can be substituted by 40 parts of zinc chlorid at about 160° C., which after the condensation must be removed by washing with water acidulated with hydrochloric acid.

In place of 1-oxy-2-naphthoyl-o-benzoic acid I may use their derivatives substituted in 4-position of the naphthalene nucleus by $SO_3H$, halogen $NH_2$. The 4-sulfo-, 4-chlorin, 4 bromin-1-oxy-2-naphthoyl-o-benzoic acids produce similar dyestuffs as described hereinbefore. The 4-amino-1-oxy-2-naphthoyl-o-benzoic acid gives a dyestuff which from an acid bath dyes wool blue shades, wool and cotton mordanted with aluminum salts or chromium salts pure green shades.

Now what I claim is:

1. The process of manufacturing phthalein mordant dyestuffs consisting in condensing 1-oxy-2-naphthoyl-o-benzoic acid of the general formula:

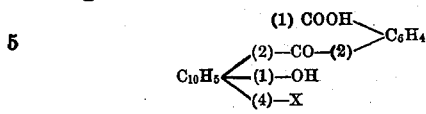

wherein X signifies hydrogen which may be replaced by a substitute e. g. SO₃H, halogen, NH₂ with pyrogallol in equimolecular proportions by means of a condensing agent.

2. The process of manufacturing a phthalein mordant dyestuff consisting in condensing 1-oxy-2-naphthoyl-o-benzoic acid with pyrogallol in equimolecular proportions by means of concentrated sulfuric acid as described.

3. The process of manufacturing a phthalein mordant dyestuff consisting in condensing 1-oxy-2-naphthoyl-o-benzoic acid with pyrogallol in equimolecular proportions.

4. As new products the phthalein mordant dyestuffs of the general formula:

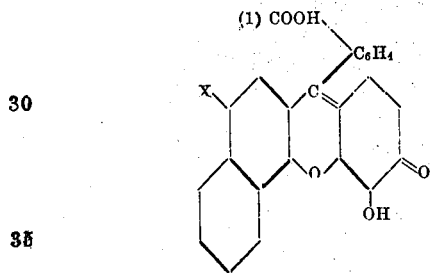

wherein X signifies hydrogen which may be replaced by a substitute e. g. SO₃H halogen, NH₂ which dyestuffs are in the shape of their sodium salts dark blue powders readily soluble in water with a violet to a blue color and which turn to a blue-green by the addition of soda-lye, and by adding caustic soda-lye to a green color; dissolved in concentrated sulfuric acid they give a red color and dye wool and cotton mordanted with aluminum salts from green to dark blue shades, and mordanted with chromium salts from yellowish-green to bluish-green shades.

5. As new product the phthalein mordant dyestuff of the formula:

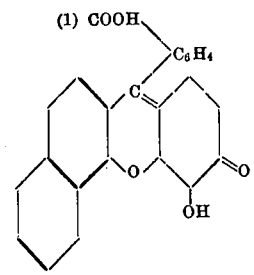

which dyestuff is in the shape of its sodium salt a dark violet-blue powder, readily soluble in water, giving a violet shade, in soda-lye a blue green, in caustic soda-lye a green color; in concentrated sulfuric acid it dissolves to a red color, when adding water to this solution the free dyestuff acid precipitates as a dark red powder, dyeing wool and cotton mordanted with aluminum salts navy-blue shades, mordanted with chromium salts bluish-green shades of very good fastness to light, to fulling and to potting.

Signed at Basel in Switzerland this 30th day of October, A. D. 1915.

Dr. HANS HAGENBACH.

Witnesses:
CH. BURGET,
ARNOLD ZUBER.